United States Patent Office 3,293,264
Patented Dec. 20, 1966

3,293,264
SYNTHESIS OF 2,3-DIHYDROTHIOPHENE-1,
1-DIOXIDE
Robert P. Yunick, Schenectady, N.Y., assignor to Union Carbide Corporation, a corporation of New York
No Drawing. Filed Sept. 14, 1964, Ser. No. 396,348
4 Claims. (Cl. 260—332.1)

This invention relates to a method for producing 2,3-dihydrothiophene-1,1-dioxide. More particularly, this invention relates to the conversion of certain ethers of tetrahydrothiophene-1,1-dioxide to 2,3-dihydrothiophene-1,1-dioxide.

In the past, 2,3-dihydrothiophene-1,1-dioxide generally has been produced by the base-catalyzed isomerization of 2,5-dihydrothiophene-1,1-dioxide. In such a process an equilibrium mixture of the two isomers is formed which contains about 45 percent of the 2,3-dihydro-isomer. This process is highly inefficient because, to enable recovery of the 2,3-isomer, it is necessary to heat the equilibrium mixture to decompose the 2,5-isomer, resulting in a loss of about 55 percent of the starting material.

It has been discovered by this invention that 2,3-dihydrothiophene-1,1-dioxide can be produced in good yields with high efficiencies by the pyrolysis of certain ethers of tetrahydrothiophene-1,1-dioxide. These ethers can be represented by the general formula:

(I) 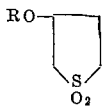

wherein R is a saturated aliphatic oxyhydrocarbyl radical bonded through a carbon atom to the oxytetrahydrothiophene-1,1-dioxide group. By the term "oxyhydrocarbyl radical," as employed herein, is meant a radical consisting of oxygen, carbon and hydrogen wherein the oxygen is present in the form of a hydroxyl group, an ether linkage or a carbonyloxy group. Preferred are ethers wherein the oxyhydrocarbyl radical contains from 2 to 10 carbon atoms and from 1 to 2 oxygen atoms.

A preferred class of ethers are 3-(hydroxyalkoxy)tetrahydrothiophene-1,1-dioxide, their alkyl ethers and their alkanoyl esters, as represented by the formula:

(II) 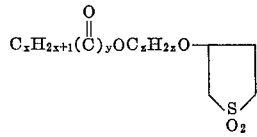

wherein $x$ is an integer having a value of from 0 to 5 inclusive, $y$ is an integer having a value of from 0 to 1 inclusive and is 0 when $x$ is 0; and $z$ is an integer having a value of from 2 to 5 inclusive. Particularly preferred are the 5-(hydroxyalkoxy)thiophene-1,1-dioxides wherein $x$ and $y$ in the above formula are both 0.

Suitable ethers include 3-(hydroxyalkoxy)tetrahydrothiophene-1,1-dioxides such as:

3-(hydroxyethoxy)tetrahydrothiophene-1,1-dioxide,
3-(2-hydroxypropoxy)tetrahydrothiophene-1,1-dioxide,
3-(3-hydroxypropoxy)tetrahydrothiophene-1,1-dioxide,
3-(4-hydroxybutoxy)tetrahydrothiophene-1,1-dioxide,
3-(5-hydroxypentoxy)tetrahydrothiophene-1,1-dioxide, and the like;

3-(alkoxyalkoxy)tetrahydrothiophene-1,1-dioxides, such as 3-(2-methoxyethoxy)tetrahydrothiophene-1,1-dioxide,
3-(2-ethoxyethoxy)tetrahydrothiophene-1,1-dioxide,
3-(2-ethoxypropoxy)tetrahydrothiophene-1,1-dioxide,
3-(3-ethoxypropoxy)tetrahydrothiophene-1,1-dioxide, and the like;

3-(alkanoyloxyalkoxy)tetrahydrothiophene-1,1-dioxides such as 3-(2-acetoxyethoxy)tetrahydrothiophene-1,1-dioxide,
3-(2-propionoxyethoxy)tetrahydrothiophene-1,1-dioxide, and the like; et cetera.

The starting materials are readily produced by the base-catalyzed reaction of 2,5-dihydrothiophene-1,1-dioxide with an alcohol of the formula ROH wherein R is as defined above; i.e., a diol or a mono-ether or a mono-ester thereof, at a temperature below about 90° C.

The pyrolysis of this invention is readily conducted by passing vapors of the ether through a pyrolysis zone maintained at an elevated temperature. The ether can be fed to the pyrolysis zone alone or entrained in an inert carrier gas, such as nitrogen. The latter procedure is preferred to ensure a positive flow of vapors through the zone and a uniform residence time.

The temperature at which the process of this invention is conducted in is not highly critical, and temperatures in the range of from about 200° C. to about 750° C. can be employed. Temperatures in the range of from about 500° C. to about 650° C. are preferred.

The residence time in the pyrolysis zone is not highly critical and can vary from about 0.5 second to about 1 minute or more, depending upon the temperature of pyrolysis. Shorter contact times should be employed at more elevated temperatures.

The pressure is not critical, and sub- and super-atmospheric pressures can be employed. It is preferred to employ atmospheric pressure, however, since no particular advantage is gained with higher or lower pressures.

The following examples are illustrative.

EXAMPLE 1

The apparatus employed consisted of a vertical glass column packed with glass helices, about 20 mm. of which was heated at 515° C. by an electric furnace to form a pyrolysis zone. Liquid 3-(2-hydroxyethoxy)tetrahydrothiophene-1,1-dioxide weighing 50 grams was fed at a rate of 0.8 ml. per minute to the top of the column with a stream of nitrogen gas at a rate of 20 to 30 ml. per minute to give a residence time in the pyrolysis zone of about 20 seconds. The pyrolysis products were condensed in a Dry Ice-acetone-cooled trap. The pyrolyzate, weighing 46 grams, was vacuum distilled to recover 6.3 grams of ethylene glycol, 13.0 grams of 2,3-dihydrothiophene-1,1-dioxide and 19.1 grams of 3-(2-hydroxyethoxy)tetrahydrothiophene-1,1-dioxide. The efficiency of the reaction, based on 2,3-dihydrothiophene-1,1-dioxide and 3-(2-hydroxyethoxy)tetrahydrothiophene - 1,1 - dioxide recovered was 79.9 percent.

EXAMPLE 2

Employing apparatus and procedures similar to those described in Example 1, 3(4-hydroxybutoxy)tetrahydrothiophene-1,1-dioxide was pyrolyzed at 565° C. to produce 2,3-dihydrothiophene-1,1-dioxide in 40.3 percent yield and at 54.1 percent efficiency.

EXAMPLE 3

Employing apparatus and procedures similar to those described in Example 1, 3-(2-methoxyethoxy)tetrahydrothiophene-1,1-dioxide was pyrolyzed at 615° C. to produce 2,3-dihydrothiophene-1,1-dioxide.

EXAMPLE 4

Employing apparatus and procedures similar to those described in Example 1, 3-(2-acetoxyethoxy)tetrahydrothiophene-1,1-dioxide was pyrolyzed at 615° C. to produce 2,3-dihydrothiophene-1,1-dioxide.

What is claimed is:

1. The method for producing 2,3-dihydrothiophene-1,1-dioxide which comprises heating at a temperature of from 200° C. to 750° C. a compound of the formula:

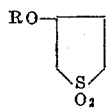

wherein R is a saturated aliphatic oxyhydrocarbyl radical bonded through a carbon atom to the oxytetrahydrothiophene-1,1-dioxide group and containing from 2 to 10 carbon atoms and from 1 to 2 oxygen atoms, said oxygen being present in the form of a moiety selected from at least one member of the group consisting of a hydroxyl moiety, an ether moiety or a carbonyloxy moiety.

2. The method for producing 2,3-dihydrothiophene-1,1-dioxide which comprises heating at a temperature of from 200° C. to 750° C. a compound of the formula:

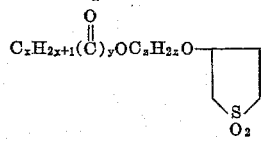

wherein $x$ is an integer having a value of from 0 to 5 inclusive; $y$ is an integer having a value of from 0 to 1 inclusive and is 0 when $x$ is 0; and $z$ is an integer having a value of from 2 to 5 inclusive.

3. The method for producing 2,3-dihydrothiophene-1,1-dioxide which comprises heating at a temperature of from 200° C. to 750° C. a 3-(hydroxyalkoxy)tetrahydrothiophene-1,1-dioxide containing from 2 to 5 carbon atoms in the hydroxyalkoxy group thereof.

4. The method for producing 2,3-dihydrothiophene-1,1-dioxide which comprises heating at a temperature of from 200° C. to 750° C. 3-(2-hydroxyethoxy)tetrahydrothiophene-1,1-dioxide.

No references cited.

WALTER A. MODANCE, *Primary Examiner.*

JAMES A. PATTEN, *Assistant Examiner.*